US008753085B2

(12) United States Patent
Lovgren et al.

(10) Patent No.: US 8,753,085 B2
(45) Date of Patent: Jun. 17, 2014

(54) DEVICE FOR CHANGING A PITCH OF A BLADE OF AN IMPELLER/PROPELLER AND A FAN COMPRISING THE DEVICE

(75) Inventors: Torbjorn Lovgren, Kode (SE); Pontus Claesson, Helsingborg (SE)

(73) Assignee: Aktiebolaget SKF, Gothenburg (DE)

( * ) Notice: Subject to any disclaimer, the term of this patent is extended or adjusted under 35 U.S.C. 154(b) by 946 days.

(21) Appl. No.: 12/864,478

(22) PCT Filed: Dec. 19, 2008

(86) PCT No.: PCT/SE2008/000738
§ 371 (c)(1),
(2), (4) Date: Jul. 23, 2010

(87) PCT Pub. No.: WO2009/093937
PCT Pub. Date: Jul. 30, 2009

(65) Prior Publication Data
US 2011/0038730 A1    Feb. 17, 2011

(30) Foreign Application Priority Data
Jan. 25, 2008 (SE) ....................................... 0800187

(51) Int. Cl.
*F04D 29/36* (2006.01)
(52) U.S. Cl.
USPC ........................ 416/162; 416/165; 416/168 R
(58) Field of Classification Search
USPC .......... 415/129–132; 416/159, 162, 163, 164, 416/165, 168 R, 168 A
See application file for complete search history.

(56) References Cited

U.S. PATENT DOCUMENTS

| 718,881 | A | * | 1/1903 | Sarr .................................. 440/50 |
| 1,242,788 | A | * | 10/1917 | Francisco ................. 416/168 R |
| 1,347,377 | A | | 7/1920 | Jensen |
| 1,869,280 | A | | 7/1932 | Roemisch |
| 2,850,106 | A | | 9/1958 | Swan |
| 4,718,823 | A | * | 1/1988 | Dennison ....................... 416/162 |
| 4,881,874 | A | | 11/1989 | White et al. |
| 5,028,210 | A | * | 7/1991 | Peterson et al. .............. 416/164 |
| 5,431,539 | A | * | 7/1995 | Carvalho .................. 416/168 R |
| 5,779,446 | A | | 7/1998 | Althof et al. |
| 7,156,707 | B2 | * | 1/2007 | Rosenkranz et al. ........... 440/50 |

FOREIGN PATENT DOCUMENTS

| CN | 1829628 A | 9/2006 |
| CN | 200999756 Y | 1/2008 |
| EP | 0361982 A2 | 4/1990 |
| FI | 28311 A | 9/1956 |
| JP | 58013198 A | 1/1983 |
| JP | 61077593 A | 4/1986 |

* cited by examiner

*Primary Examiner* — Christopher Verdier
(74) *Attorney, Agent, or Firm* — Bryan Peckjian; SKF USA Inc. Patent Department

(57) ABSTRACT

A device for changing a pitch of a blade of an impeller/propeller is disclosed. The device includes a linear actuator, a first bearing and a second bearing, allowing a relative axial movement between the first bearing and second bearing. The first bearing is mounted between a supporting structure of the rotor shaft and a non-rotary mechanical element, allowing a relative rotation between the supporting structure and the linear actuator. The second bearing is mounted between the second portion and a lever having a rotary point. Operating the linear actuator leads to an angular movement of the lever causing a change of the pitch of a blade, and when operating the at least one linear actuator, a force is generated that acts upon the non-rotary element, so that the rotor shaft is unaffected by the force.

17 Claims, 3 Drawing Sheets

DEVICE FOR CHANGING A PITCH OF A BLADE OF AN IMPELLER/PROPELLER AND A FAN COMPRISING THE DEVICE

TECHNICAL FIELD

According to a first aspect, the present invention relates to a device for changing a pitch of a blade of an impeller/propeller.

According to a second aspect, the present invention relates to a fan comprising the first aspect.

SUMMARY OF INVENTION

According to a first aspect, a device for changing a pitch of a blade of an impeller/propeller is disclosed. The device comprises at least one linear actuator, having first and second portions which are movable in relation to each other, wherein the at least one actuator is a nut and screw arrangement. It further comprises a first bearing mounted to a non rotary mechanical element in rigid connection with the first portion. A second bearing is mounted to the second portion, allowing a relative axial movement between the first bearing and second bearing. The relative axial movement is driven by the at least one linear actuator. The first bearing is mounted between a supporting structure of the rotor shaft and the non rotary mechanical element, allowing a relative rotation between the supporting structure and the at least one linear actuator. The second bearing is mounted between the second portion and a lever means having a rotary point at the supporting structure. The lever means is fixable to the blade, allowing a relative pitching of the blade. When operating the at least one linear actuator, the second portion is moved axially, leading to an angular movement of the lever means causing a change of the pitch of a blade. Also, when operating the at least one linear actuator, a force is generated that acts upon the non rotary mechanical element, so that the rotor shaft is unaffected by the force.

An advantage is based on that the at least one actuator does not rotate, since it is mounted to a non rotary mechanical element. This leads to that the at least one actuator, including motor, component and sub systems that may need to exchange media or signals with its technical surrounding, is non rotating and thus avoid the problem of having complex arrangements necessary to drive the linear actuator, e.g. there is no need to supply electrical power, pressurized hydraulic oil, or pneumatic pressure to a rotating part. Another advantage is the reduced effect of balance problems. A rotating linear actuator may introduce problems with deviation inertia in the rotating parts. Minimising the rotating parts leads thus to a more balanced rotating system, also in view of a lower mass that will rotate.

Another advantage is that there is no axial force on the rotary shaft when the at least one actuator is operated since this force instead is exerted onto the non rotary element. For instance, this has an effect on designing the bearing arrangement supporting the rotary shaft. In an embodiment, the non rotary mechanical element is fixed, via e.g. a rod or a beam, to a stationary surrounding of the device, such as a wall, a roof, ground, or any other part that is in a vicinity of the device. In an embodiment, the non rotary mechanical element extends through a hole through a center of the rotary shaft and the non rotary element being fixed to a stationary element on another side of the rotary shaft.

In an embodiment, the device further comprises a third bearing in the supporting structure for supporting the lever means in its oscillating movement. In an embodiment, there are several bearings located in this position. This leads to an increased ability to control the movement of a blade to the right position. Also, the third bearing will lead to less energy consumed when changing pitch of a blade.

In an embodiment, the rotor shaft and the supporting structure are integrally made.

In an embodiment, the first and second bearings are capable of coping with combined radial and axial loads. The radial load will be at least the load corresponding to the own weight of the part of the device. However, depending on the application, the may be further requirements to carry higher radial loads. During operation of the at least one actuator, the lever means will oscillate which will lead to an axial load of the first and second bearings. The person skilled in the art is able to select suitable bearings to carry a combination of radial and axial loads once the load is specified. It also lies within the scope of the present invention that instead of using a single bearing as the first bearing and second bearing, equivalent bearing arrangements may be used instead. For instance, this means that the first bearing may be replaced with one bearing capable of coping with radial load and another bearing able to cope with axial loads. Further, this means that the second bearing may be replaced with one bearing capable of coping with radial load and another bearing able to cope with axial loads.

In an embodiment, the bearing arrangement is also intended be able to cope with tilt load and bending moment.

In an embodiment, the device further comprises a guiding means between the second portion and the second bearing. In an embodiment, the guiding means is slideable in axial direction in relation to the non rotary element. In an embodiment, the guiding means has a shape that at least partly surrounds the non rotary mechanical element. In these embodiments, there may be one or more linear actuators used to move the guiding means in axial direction. In an embodiment, there is a friction decreasing means between the inner surface of the guiding means and the non rotary element.

In an embodiment, a linear bearing is a part of the guiding means.

In an embodiment, the non rotary mechanical element is an integral part of the first portion. Thus the first bearing is fixed to the first portion.

In embodiments, the linear actuator is one of a hydraulic, pneumatic or electro mechanical linear actuators.

In embodiment, the linear actuator is one of a screw, roller screw, or a ball screw.

In an embodiment, the at least one linear actuator is a plurality of linear actuators. This offers the opportunity of replacing a more advanced linear actuator with two or more simpler linear actuators. Also, having more than a single linear actuator leads accordingly to a more robust design since it may still be operative even if one linear actuator would fail.

In an embodiment, the plurality of linear actuators is located equi-angularly around a peripheral surface of the non rotary mechanical element.

In an embodiment, the plurality of linear actuators are located non-equi-angularly around a peripheral surface of the rotor shaft.

In an embodiment, the device, in case of an electro mechanical linear actuator, further comprises a gear mounted to the driving screw and mountable to a motor. This offers the advantage of placing the motor in e.g. a 90 degrees angle in relation to the axial direction of the device for e.g. space reasons.

In an embodiment, the lever arm further comprises means for operating an additional blade placed at a distance from the blade in axial direction. In a fan, it is not uncommon to have two sets of blades that are spaced apart in a direction of the flow. This leads to the advantage of being capable of changing the pitch of one blade of a first arrangement of blades and a second blade of a second arrangement of blades with the use of at least one linear actuator.

According to the second aspect, a fan is disclosed. It comprises a rotor having a hub to which a plurality of blades are rotatably arranged, the fan comprises the device according to the first aspect. Features of the first aspect are applicable to features of the second aspect and vice versa.

DETAILED DESCRIPTION

Figure 1:
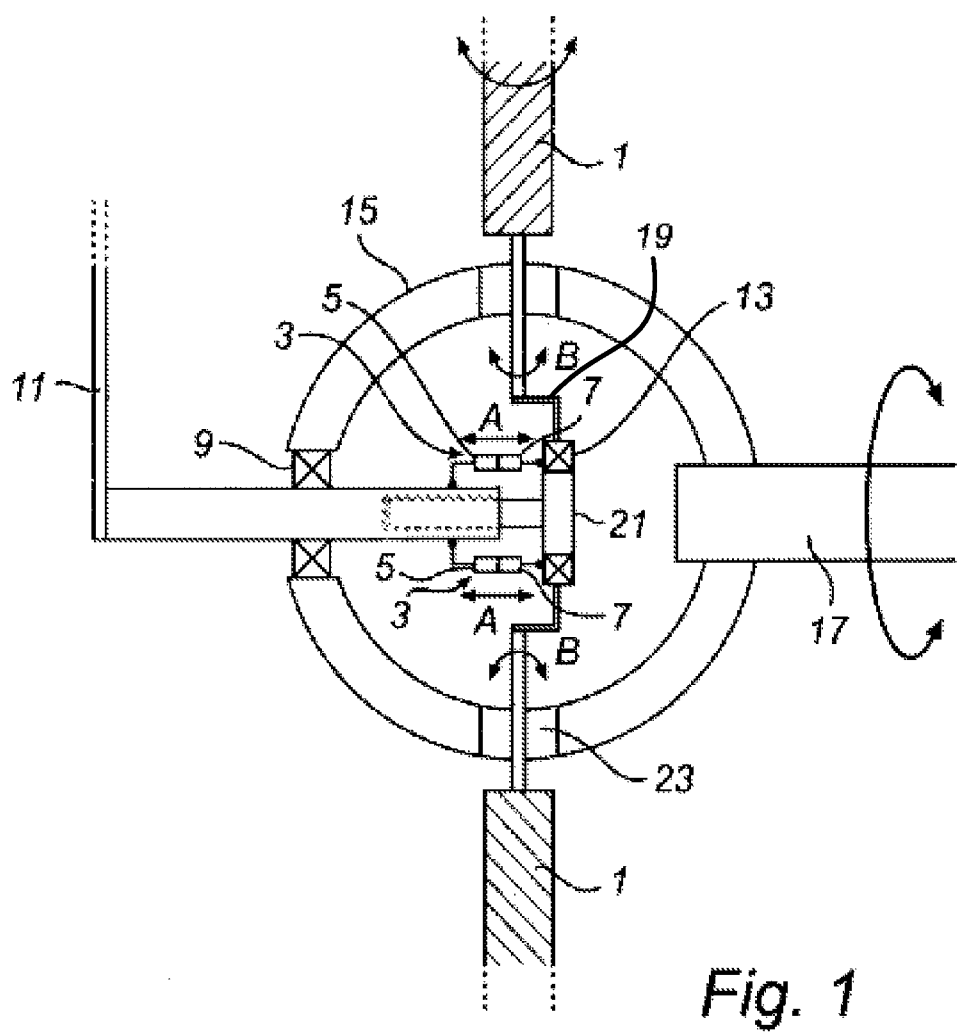
In FIG. 1, a schematic illustration of a first embodiment of the device is given.

In FIG. 1, an embodiment of a device for changing a pitch of a blade 1 of an impeller/propeller is shown. The device according to this embodiment comprises at least one linear actuator 3. The embodiment shown in FIG. 1 has two linear actuators 3. Each linear actuator 3 has first and second portions 5, 7 which are movable in relation to each other. In this embodiment, the linear actuators 3 comprise a nut and screw arrangement. A first bearing 9 is mounted to a non-rotary mechanical element 11 in rigid connection with the first portion 5, and a second bearing 13 is mounted to the second portion 7. This allows a relative axial movement between the first bearing 9 and second bearing 13. The relative axial movement is driven by the at least one linear actuator 3. The first bearing 9 is mounted between a supporting structure 15 of the rotor shaft 17 and the non-rotary mechanical element 11, allowing a relative rotation between the supporting structure 15 and the at least one linear actuator 3. The second bearing 13 is mounted between the second portion 7 and a lever means 19 having a rotary point at the supporting structure 15. The lever means 19 is fixable to the blade 1, allowing a relative pitching of the blade 1. When operating the at least one linear actuator 3, the second portion 7 is moved axially (indicated in FIG. 1 with arrows marked A), leading to an angular movement of the lever means 19 (indicated in FIG. 1 with arrows marked B) causing a change of the pitch of a blade 1. Also, when operating the at least one linear actuator 3, a force is generated that acts upon the non-rotary element 11, so that the rotor shaft 17 is unaffected by the force.

The first and second bearings 9, 13 are capable of coping with combined radial and axial loads.

In an embodiment, there is a guiding means 21 that is fixed to the second bearing 13. The guiding means 21 is intended to guide the movement of the second bearing 13. In an embodiment, the second portion 7 is fixed to the guiding means 21. In another embodiment the second portion 7 is fixed to the second bearing 13.

In an embodiment, the device further comprises a third bearing 23 in the supporting structure 15 for supporting the lever means 19 in its oscillating movement.

In an embodiment, the rotor shaft 17 and the supporting structure 15 are integrally made.

In an embodiment, the non-rotary mechanical element 11 is an integral part of the first portion 5.

In an embodiment, the linear actuator 3 is one of a hydraulic, pneumatic or electro mechanical linear actuators.

In an embodiment, the linear actuator 3 is one of a screw, roller screw, or a ball screw.

In an embodiment, the at least one linear actuator 3 is a plurality of linear actuators, that are located equi-angularly around a peripheral surface of the non-rotary mechanical element 11.

In an embodiment, the lever means 19 further comprises means, e.g. an extra arm extending such that it engages in and operates an additional blade, possibly via a joint between the extra arm and the additional blade placed at a distance from the blade 1 in axial direction.

Figure 2:
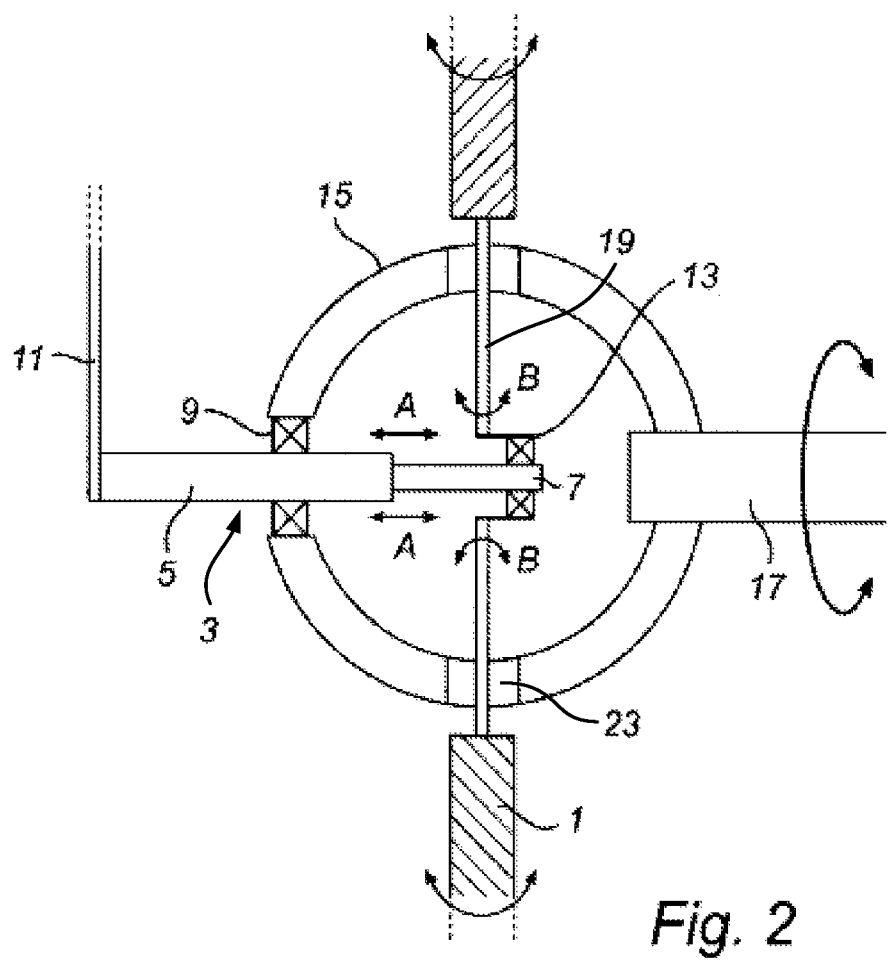
In FIG. 2, a schematic illustration of a second embodiment of the device is given.

In FIG. 2, an embodiment of a device for changing a pitch of a blade 1 of an impeller/propeller. The device comprises at least one linear actuator 3, having first and second portions 5, 7 which are movable in relation to each other. A first bearing 9 is mounted to the first portion 5, and a second bearing 13 is mounted to the second portion 7, allowing a relative axial movement between the first bearing 9 and second bearing 13. The relative axial movement is driven by the at least one linear actuator 3. The first bearing 9 is mounted between a supporting structure 15 of the rotor shaft 17 and the first portion 5, allowing a relative rotation between the supporting structure 15 and the at least one linear actuator 3. The second bearing 13 is mounted between the second portion 7 and a lever means 19 having a rotary point at the supporting structure 15. The lever means 19 is fixable to the blade 1, allowing a relative oscillating rotation of the blade 1. In an embodiment, the device comprises the blade 1. When operating the at least one linear actuator 3, the second portion 7 is moved axially (indicated in FIG. 2 with arrows marked A), leading to an oscillating movement of the lever means 19 (indicated in FIG. 2 with arrows marked B) causing a change of the pitch of a blade 1.

In an embodiment, the device further comprises a third bearing 23 in the supporting structure 15 for supporting the lever means 19 in its oscillating movement.

In an embodiment, the rotor shaft 17 and the supporting structure 15 are integrally made.

In an embodiment, the first and second bearings 9, 13 are capable of coping with combined radial and axial loads.

In an embodiment, the linear actuator 3 is one of a hydraulic, pneumatic or electro mechanical linear actuators.

In an embodiment, the linear actuator 3 is one of a screw, roller screw, or a ball screw. In this embodiment, the at least one linear actuator 3 is a single linear actuator.

In an embodiment, the lever means 19 further comprises means for operating an additional blade placed at a distance from the blade 1 in axial direction.

Figure 3:
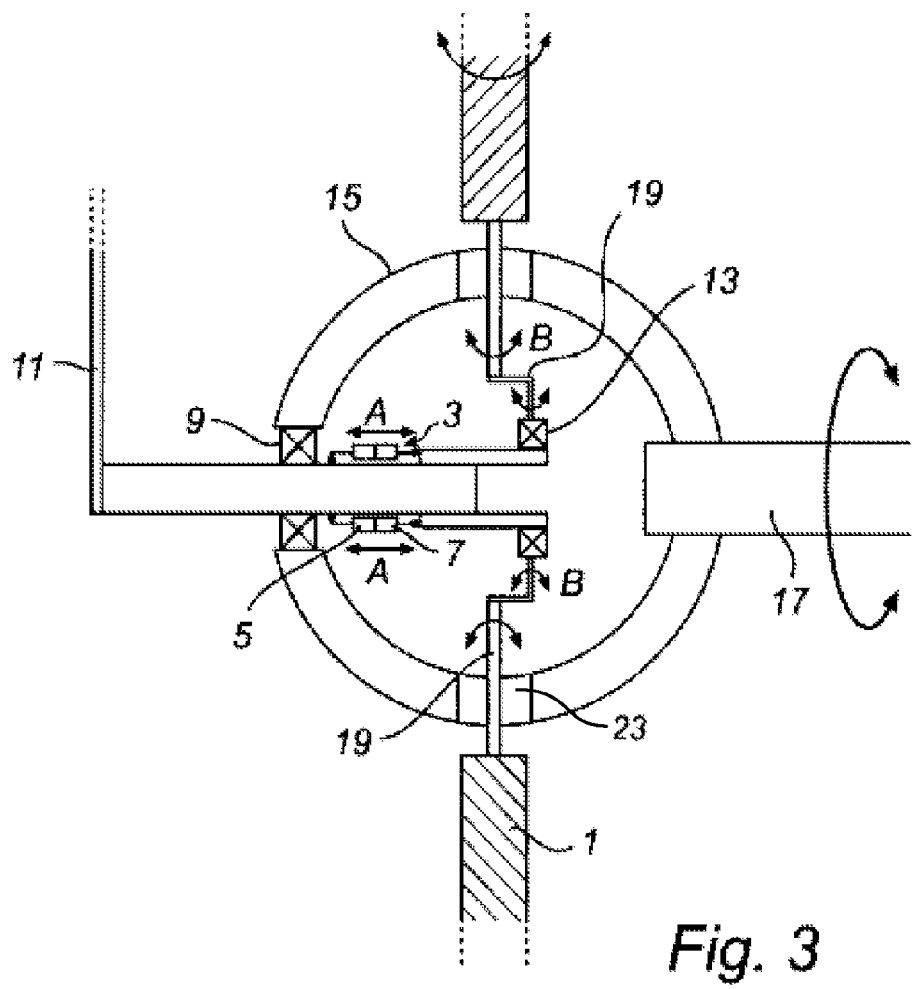
In FIG. 3, a schematic illustration of a third embodiment of the device is given.

In FIG. 3, an embodiment of the device is given. The device comprises at least one linear actuator 3, having first and second portions 5, 7 which are movable in relation to each other. A first bearing 9 is mounted to a non-rotary mechanical element 11 in rigid connection with the first portion 5. A second bearing 13 is mounted to the second portion 7, allowing a relative axial movement between the first bearing 9 and second bearing 13. The relative axial movement is driven by the at least one linear actuator 3. The first bearing 9 is mounted between a supporting structure 15 of the rotor shaft 17 and the non-rotary mechanical element 11, allowing a relative rotation between the supporting structure 15 and the at least one linear actuator 3.

The second bearing 13 is mounted between the second portion 5 and a lever means 19 having a rotary point at the supporting structure 15. The lever means 19 is fixable to the blade 1, allowing a relative oscillating rotation of the blade 1.

When operating the at least one linear actuator 3, the second portion 7 is moved axially (indicated in FIG. 3 with arrows marked A), leading to an oscillating movement of the lever means 19 (indicated in FIG. 3 with arrows marked B) causing a change of the pitch of a blade 1. In an embodiment, the device further comprises a third bearing 23 in the supporting structure 15 for supporting the lever means 19 in its oscillating movement.

In an embodiment, the rotor shaft 17 and the supporting structure 15 are integrally made.

In an embodiment, the first and second bearings 9, 13 are capable of coping with combined radial and axial loads.

In an embodiment, the device further comprises a guiding means 21 between the second portion 7 and the second bearing 13. The guiding means 21 is slideable in axial direction in relation to the non-rotary mechanical element 11. In an embodiment, the guiding means 21 has a shape that at least partly surrounds the non-rotary mechanical element 11.

In an embodiment, the linear actuator 3 is one of a hydraulic, pneumatic or electro mechanical linear actuators.

In an embodiment, the linear actuator 3 is one of a screw, roller screw, or a ball screw.

In an embodiment, the at least one linear actuator 3 is a plurality of linear actuators located equi-angularly around a peripheral surface of the non-rotary mechanical element 11.

In an embodiment, the lever means 19 further comprises means for operating an additional blade placed at a distance from the blade 1 in axial direction.

According to the second aspect, a fan includes a rotor having a hub to which a plurality of blades/wings are rotatably arranged. The fan comprises the device according to any one of the embodiments given above.

The invention claimed is:

1. A device for changing a pitch of a blade of an impeller or a propeller mounted on a rotor shaft, the shaft having supporting structure, the device comprising:
   at least one nut and screw linear actuator having first and second portions which are movable in relation to each other,
   a non-rotary mechanical element rigidly connected with the first portion of the actuator,
   lever means having a rotary point at the supporting structure, being fixable to the blade, and configured to allow a relative pitching of the blade,
   a first bearing mounted to the non-rotary mechanical element so as to be disposed between the supporting structure and the non-rotary mechanical element, the first bearing allowing a relative rotation between the supporting structure and the at least one linear actuator,
   a second bearing mounted to the second portion of the actuator so as to be disposed between the actuator second portion and the lever means, the second bearing being movable relative to the first bearing by the at least one linear actuator,
   wherein, when operating the at least one linear actuator, the actuator second portion is moved axially, leading to an angular movement of the lever means causing a change of the pitch of the blade, and a force is generated that acts upon the non-rotary element so that the rotor shaft is unaffected by the force, and wherein moving the second portion of the at least one actuator relative to the first portion of the at least one actuator causes the second bearing to move closer to or farther away from the shaft.

2. The device according to claim 1, further comprising a third bearing mounted in the supporting structure and configured to support oscillating movement of the lever means.

3. The device according to claim 1, wherein the rotor shaft and the supporting structure are integrally formed.

4. The device according to claim 1, wherein the first and second bearings are configured to support combined radial and axial loads.

5. The device according to claim 1, further comprising guiding means between the actuator second portion and the second bearing.

6. The device according to claim 5, wherein the guiding means is slideable in axial direction relative to the non-rotary element.

7. The device according to claim 5, wherein the guiding means has a shape that at least partly surrounds the non-rotary mechanical element.

8. The device according to claim 5, wherein the guiding means is disposed on a radial outside of the second bearing and the second portion of the actuator is fixed to the guiding means.

9. The device according to claim 1, wherein the non-rotary mechanical element is integrally formed with the first portion of the actuator.

10. The device according to claim 1, further comprising a hydraulic, pneumatic or electro-mechanical linear actuator.

11. The device according to claim 1, wherein the linear actuator is one of a screw, roller screw, or a ball screw.

12. The device according to claim 1, wherein the at least one linear actuator includes a plurality of linear actuators.

13. The device according to claim 12, wherein the plurality of linear actuators are evenly spaced circumferentially about a peripheral surface of the non-rotary mechanical element.

14. The device according to claim 12, wherein the plurality of linear actuators are unevenly spaced circumferentially about a peripheral surface of the rotor shaft.

15. The device according to claim 1, wherein the non-rotary mechanical element is axially offset from the rotor shaft and faces an axial end of the shaft.

16. The device according to claim 1, wherein the second bearing is axially offset from the shaft.

17. A fan comprising:
   a rotor having a supporting structure and a shaft coupled to the support structure;
   a plurality of blades mounted to and spaced circumferentially about the support structure; and
   a device for changing a pitch of at least one of the plurality of blades, the device including:
      at least one nut and screw linear actuator having first and second portions which are movable in relation to each other,
      a non-rotary mechanical element rigidly connected with the first portion of the actuator,
      lever means having a rotary point at the supporting structure, being fixable to at least one of the plurality of blades, and configured to allow a relative pitching of the at least one of the plurality of blades,
      a first bearing mounted to the non-rotary mechanical element so as to be disposed between the supporting structure and the non-rotary mechanical element, the first bearing allowing a relative rotation between the supporting structure and the at least one linear actuator,
      a second bearing mounted to the second portion of the actuator so as to be disposed between the actuator second portion and the lever means, the second bearing being movable relative to the first bearing by the at least one linear actuator,
      wherein, when operating the at least one linear actuator, the actuator second portion is moved axially, leading to an angular movement of the lever means causing a change of the pitch of the at least one of the plurality of blades, and a force is generated that acts upon the non-rotary element so that the rotor shaft is unaffected by the force, and wherein operating the at least one nut-and-screw actuator moves the second bearing closer to or farther away from the shaft.

\* \* \* \* \*